UNITED STATES PATENT OFFICE.

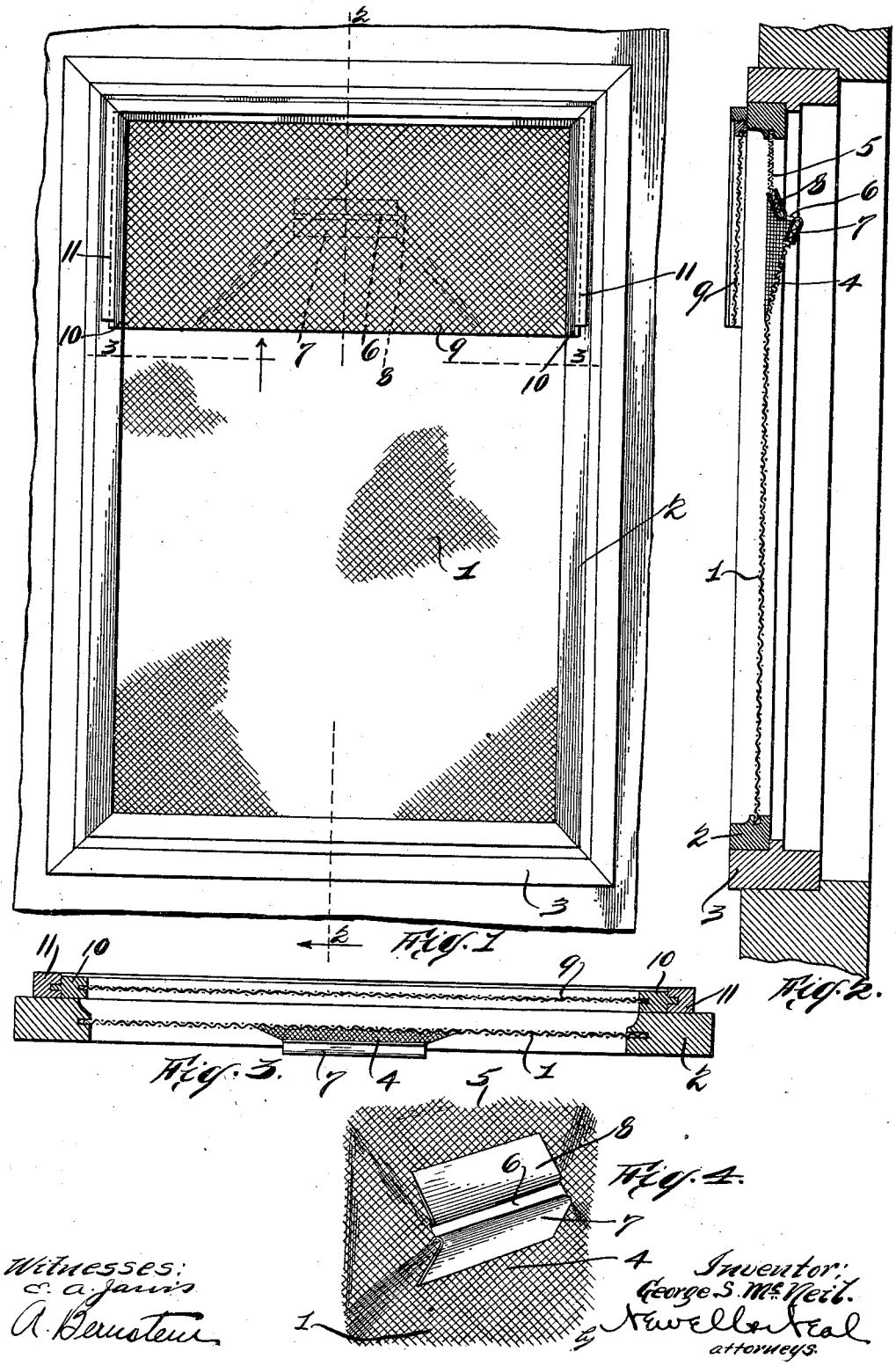

GEORGE S. McNEIL, OF NEW YORK, N. Y., ASSIGNOR TO CHARLES A. McNEIL, OF NEW YORK, N. Y.

FLY-REMOVING DEVICE.

1,046,831.      Specification of Letters Patent.      Patented Dec. 10, 1912.

Application filed December 22, 1911. Serial No. 667,407.

*To all whom it may concern:*

Be it known that I, GEORGE S. McNEIL, a citizen of the United States, residing at New York city, New York, have invented certain new and useful Improvements in Fly-Removing Devices, of which the following is a clear, full, and exact description.

This invention relates to an improvement in devices for the removal of flies either from the house or any other inclosure.

The present device may be suitably applied to a screen door or window, and preferably one that serves as a closure across a fairly well lighted opening.

In the construction of the present device, advantage is taken of the natural propensity of flies to always crawl upwardly upon any vertically disposed surface, particularly any well lighted surface, such as a screen placed in a window.

The principle according to which my improvement is constructed and the preferred embodiment of the same, will clearly appear from the following specification, and the scope of the invention more particularly pointed out in the appended claims.

Referring to the drawings Figure 1 is a front elevation of the entire device; Fig. 2 is a vertical section of the same through line 2—2 of Fig. 1; Fig. 3 is a horizontal section of the same through line 3—3 of Fig. 1; and Fig. 4 is a detailed perspective of the outlet opening.

Referring more particularly to the drawings, 1 indicates the wire mesh of any suitable vertically disposed screen such as is usually placed over a window. Said screen may have a border frame 2 adapted to be mounted within the window frame 3, and adjacent to its upper end is formed a slotted opening 6 adapted to provide an outlet through which flies will be induced to crawl by reason of the particular construction hereinafter described. The outlet 6 is preferably of restricted proportions being sufficiently wide to allow a fly to crawl therethrough, and the adjacent portion 4 of the screen below the outlet 6 is offset outwardly as shown to a greater extent than the upper adjacent portion 5 of said screen, whereby said outlet 6 is disposed horizontally. The outlet 6 and the adjacent offset portion 4 may be suitably stamped or formed by an embossing tool in the manufacture of the screen and the rough bordering edges of the outlet 6 are preferably protected by caps of smooth material such as 7 and 8, whereby the fly meets with no obstructions in his travel.

In addition to the horizontally disposed outlet 6 at the upper end of the screen, there is preferably an inner screen portion 9 spaced from the upper part of the main or outer screen and terminating at its lower end below the outlet 6, all as clearly shown in Fig. 2. The inner screen portion 9 is also removably mounted upon the outer screen portion preferably by tenon and grooved sides as shown in Fig. 3, whereby is may be easily removed for cleaning the main screen.

In use the present device will act as follows: The flies alighting upon the screen 1 will naturally crawl upwardly along the same into the space between the inner screen portion 9 and outer screen 1, and their steps will naturally be directed toward the outlet 6 so that they will pass out through the same. Any flies which pass around the ends of outlet 6 will find themselves between two screen portions which practically form a trap, leaving the outlet 6 as the most successful means of escape. I have found that the natural tendency of flies to travel upwardly along such inclosing surfaces will prevent their escaping under the lower end of the inner screen portion 9 rather than by the outlet 6, and this same tendency also prevents flies on the other side of the screen from alighting on the outside of the same and traveling downwardly through the outlet 6, and even if this should occasionally occur, such flies will find themselves within the trap formed by inner screen portion 9, and would eventually escape back through the outlet 6 rather than into the room.

It is obvious that the outlet 6 may be longer in extent if desired than that herein shown, and that many other variations in the form and proportions of parts in my device may be made without departing from the spirit or scope of my invention as defined in the appended claims.

What I claim is:

1. A fly removing device comprising a vertically disposed screen having a portion offset adjacent its upper end to form a horizontally disposed outlet, an inner screen portion spaced from the upper part of said outer screen and terminating below said outlet.

2. A fly removing device comprising a vertically disposed outer screen having a narrow slot through its upper end with the adjacent portion of said screen below said slot offset outwardly to form a horizontally disposed outlet, an inner screen portion removably mounted at the upper part of said outer screen terminating below said outlet and spaced therefrom.

3. A fly removing device comprising a vertically disposed outer screen having a narrow slot through its upper end with the adjacent portion of said screen below said slot offset outwardly to form a horizontally disposed outlet, the edges of said outlet being inclosed by a cap of smooth material, an inner screen portion removably mounted at the upper part of said outer screen terminating below said outlet and spaced therefrom.

Signed at New York this 9" day of December, 1911.

GEORGE S. McNEIL.

Witnesses:
FLORENCE JACKSON,
BEATRICE MIRVIS.

---

Copies of this patent may be obtained for five cents each, by addressing the "Commissioner of Patents, Washington, D. C."